Dec. 21, 1965  R. W. TOLMIE  3,225,199
RADIOISOTOPE IDENTIFIER
Filed May 14, 1962
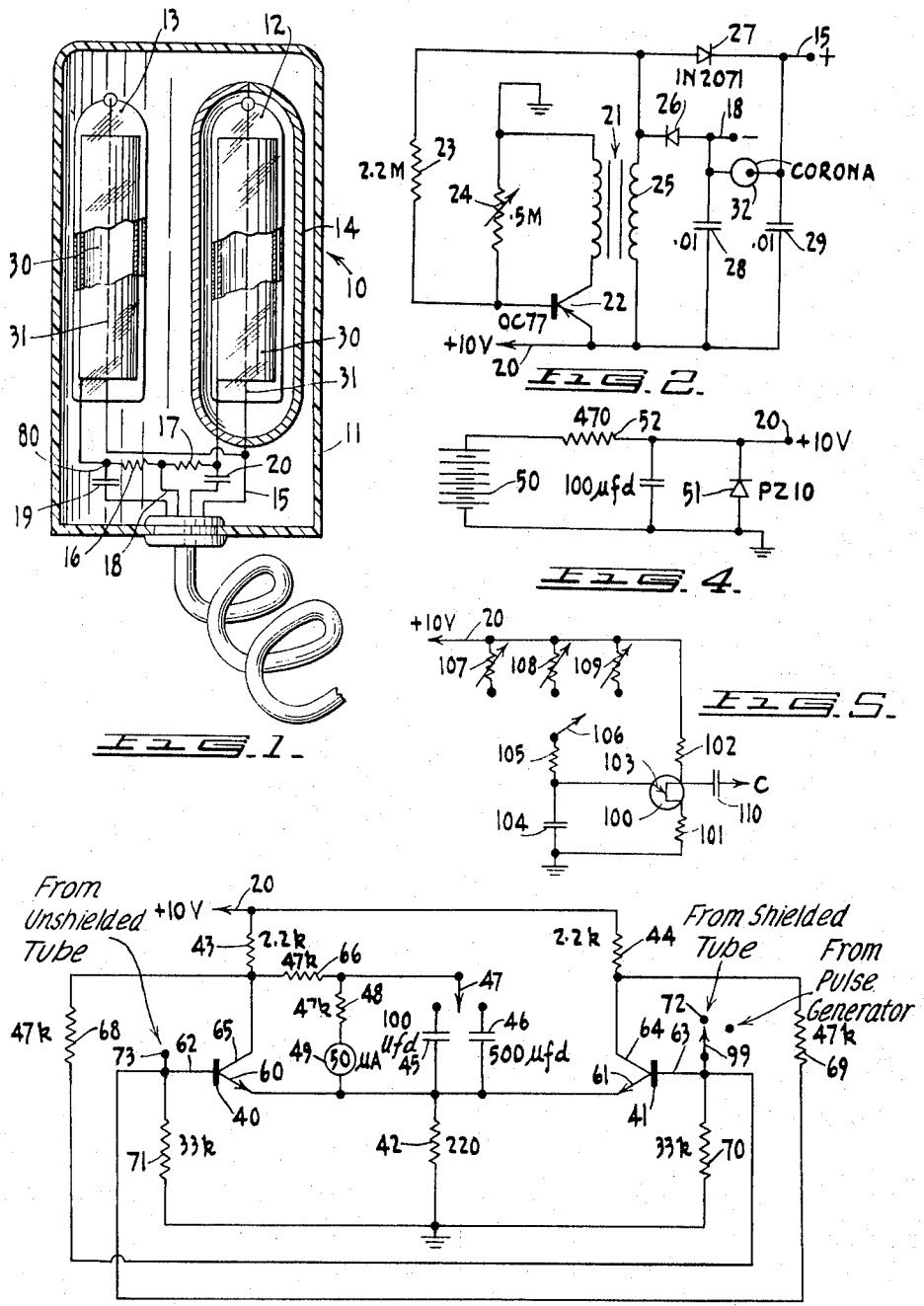

United States Patent Office 3,225,199
Patented Dec. 21, 1965

3,225,199
RADIOISOTOPE IDENTIFIER
Ronald W. Tolmie, Ottawa, Ontario, Canada, assignor to Atomic Energy of Canada Limited, Ottawa, Ontario, Canada
Filed May 14, 1962, Ser. No. 194,384
Claims priority, application Canada, Jan. 8, 1962, 839,547
5 Claims. (Cl. 250—83.6)

This invention relates to a device for measuring the energy of local radiation and finds particular application in a portable apparatus for the identification of a radioactive isotope by the energy which it emits.

In the past it has been relatively easy to measure the intensity of radiation in any particular local area, but it has not generally been possible to identify the substance producing the radiation without making a number of separate tests.

An apparatus constructed in accordance with the teaching of the present invention overcomes much of the difficulty associated with this type of measurement and can be used for routine checking of isotopes taken from a reactor or in a production line to determine that there is no accidental interchange or incorrect marking of substances. It will also find use in the identification of radioactive substances found on floors, walls, in air filters, clothing or elsewhere.

More particularly in accordance with the invention, there is provided an apparatus for measuring the energy of local radiation which comprises, a pair of radiation detectors of the counting pulse type, whose rate of counting depends upon the quantity of radiation intercepted in a given time interval, a radiation absorbing shield for absorbing a proportion of the radiation falling on one of said detectors, said proportion being dependent upon the energy of the radiation, means for deriving the ratio of the number of counts of said shielded detector and the sum of the number of counts on both said detectors as a voltage, and means for measuring said voltage, said measured voltage being a function of the local radiation energy.

Reference will now be made to the drawings of an embodiment of the invention, in which:

FIGURE 1 shows a side elevation partly in section of a probe for use in the invention;

FIGURE 2 shows a schematic circuit diagram of a high voltage supply unit for the probe of FIGURE 1;

FIGURE 3 shows a schematic circuit diagram of a two stable state multivibrator circuit;

FIGURE 4 shows a stablised power supply for the circuit of FIGURES 2 and 3; and

FIGURE 5 shows schematically a circuit for generating a known pulse rate when the intensity of a radiation field is being examined.

In FIGURE 1, a probe 10 is shown comprising an outer wear protective covering of a plastic substance such as molded Bakelite 11 which contains two radiation sensitive tubes 12 and 13 suitably of the Geiger-Mueller type. One of the tubes 12 is mounted within a radiation shield 14 whose thickness is determined as will be explained later by the intensity of radiation likely to be encountered. The other tube 13 is merely supported within the covering 10 with much less or no screening. Each tube has its inner electrode 31 connected to a wire 15 and the outer electrode 30 through a load resistance 16 and 17 respectively to a second wire 18. Condensers 19 and 20 lead off the pulse output signal developed across respective resistances 16 and 17 whenever the associated tube strikes and becomes conducting. In some applications the simple Geiger tubes shown here may be replaced by scintillation counters using photomultiplication of the flash produced by a radiation particle encountering a phosphor. In these detectors a pulse similar to that of the Geiger-Mueller tube is produced.

A high voltage supply placed across wires 15 and 18 is shown in FIGURE 2. A stabilised potential of about 10 volts is applied between ground and input point 20 to feed the oscillator circuit comprising transformer 21 and power transistor 22. Positive feedback to the base of transistor 22 from output winding 25 is obtained through resistance 23. Variable resistance 24 allows adjustment of the base bias current. Output winding 25 of transformer 21 feeds rectifiers 26 and 27 connected in a voltage doubling arrangement to produce outputs in opposite polarity with respect to ground at wires 15 and 18. The rectifiers are followed by smoothing condensers 28 and 29 and the voltage between lines 15 and 18 is stabilised by means of corona 32.

FIGURE 3 shows a pair of transistors 40 and 41 connected in a two stable state flip-flop circuit. The emitters 60 and 61 of the two transistors 40 and 41 are connected to ground through a common resistor 42 to help to equalise their outputs and prevent thermal run away. The base 62 and 63 of each transistor is coupled to the collector load resistance 44 and 43 of the other transistor through a series resistor 68 and 69, which form voltage dividers with grounded resistors 70 and 71 respectively. These loads 43 and 44 are supplied with a stabilised D.C. voltage, again of about 10 volts, at wire 20. (See also FIGURES 2 and 4.) The condenser 19 for tube 13 is connected to base 62 at point 73 whilst condenser 20 for shielded tube 12 is joined to base 63 through switch 99 at point 72. The voltage appearing at collector 65 is fed through a resistance 66 to a smoothing condenser 45 or 46 connected to the emitters of transistors 40 and 41 and which can be selected individually by means of switch 47. The smoothed potential difference across the condenser 46 or 47 is taken through a suitable series resistor 48 to a microammeter 49. In some instances it may be desired to take the side of the meter 49 remote from the resistor 48, and the corresponding side of the smoothing condenser 45 or 46 to ground, or even to wire 20 to measure the integrated potential difference across the load 43. In all these and any other cases the purpose is to obtain a reading of the meter related to $$\frac{A}{A+B}$$

The value given for all the resistances and condensers in FIGURES 2 and 3 are shown only by way of example and they may require to be varied as the transistors employed are changed or as other parts of the circuit are changed in a manner with which those skilled in the art will be acquainted. It will also be apparent that thermionic devices as electronically controlled elements may be substituted for the transistors shown, in a manner that those skilled will appreciate.

The circuit shown in FIGURE 4 for providing a stable voltage between wire 20 and ground comprises a battery 50 feeding a Zener diode 51 shunted by smoothing capacitor 53 through a load resistor 52. The diode 51 for the embodiment of the invention shown here stabilises the potential at 10 volts.

Before discussing the operation of the circuit, let us consider the effect of gamma radiation falling on the probe shown in FIGURE 1. Now the attenuation introduced by a gamma ray absorber such as shield 14 does not depend upon the intensity of the radiation field, but only on the energy of the radiation, i.e. the absorption coefficient is a function of the energy of the radiation. Thus the ratio of outputs from an unscreened detector and a screened detector in various intensities of radiation will remain constant unless the energy of the radiation changes. Hence for radioactive isotopes emitting gamma rays of only one energy, the ratio of signals from such detectors is related in an unambiguous way to the gamma ray energy. For detectors of the type described here, giving a pulse counting output, each of which is connected to one side of a two stable state flip-flop circuit, on the average, the time during which the circuit is in one or other of the conducting states is proportional to the number of counts of the one or other detector. If in the circuit shown in FIGURE 3 the counting rate of tube 13 is A and that of shielded tube 12 is B, the integrated voltage to which condenser 45 or 46 will be charged is a linear function of $$\frac{A}{A+B}$$

This is so because during a conducting period of transistor 40 there is a voltage drop in resistor 43 (bringing the junction of resistors 43 and 66 almost to ground potential) due to the collector current, and the bleed current through resistor 68. During the cut-off period of transistor 40 the voltage of the junction of resistors 43 and 66 rises to approach that of the wire 20, there being only a small drop in resistor 43 due to the bleed current through resistor 68 and the meter 49. The average voltage of the junction of resistors 43 and 66 is thus directly proportional to the proportion of the time that transistor 40 is cut-off, i.e. to the proportion of the counts of the shielded tube 12. The voltage as measured by the meter 49 is hence a function of the energy of the gamma radiation. The switch 47 is used for selecting the time constant of the integrating circuit to which meter 49 is connected. This time constant should be as small as possible consistent with steady reading of the meter. In the circuit shown, condenser 45 is used for high count rates, condenser 46 for lower.

Meter 49 may be calibrated to read in radioactive elements for a given thickness of absorber 14 since the gamma ray energy encountered with any one element is in general characteristic of that element. For isotopes which emit more than one characteristic gamma ray the ratio signals will become a function of the sum of each one of the energies. But since these energies are always in the same proportion for a given isotope the ratio of the signals will still have a unique value for that isotope so that it can be identified by a single point on the scale of the meter 49. It is desirable that the meter 49 also be calibrated to read percentage transmission per centimeter of absorber as a broadly more useful figure.

It has been found in practice useful to have three separate probes for the identifier, dependent upon the intensity of the field in which it is to be used. In one working apparatus, in each probe the shielded tube was enclosed in a 1 cm. thick lead cylindrical shield 14. The first probe used two 20th Century G1OH tubes for a radiation field in the range of 1 to 30 mr./hr. The second probe used Mullard MX-119 tubes for 30 to 1,000 mr./hr. and the third used Phillips 18509 tubes for the range 1 to 30 mr./hr. The essential difference between all three types of tubes was that those for the higher fields needed to intercept more radiation before firing than the more sensitive ones.

Because of the large number of radio isotopes now available it is inevitable that some of these will give nearly identical signal ratios when measured with a single probe with a single absorbing material. It is possible to increase the difference in ratios between two given isotopes by selecting the most appropriate absorbing material, changing the thickness of the absorber, or by using different absorbers on both tubes. As an alternative, instead of using an annular cylinder of lead as shown in FIGURE 1, two half cylinders of lead and steel split lengthwise on a diameter could enclose the tube 12. Thus in FIGURE 1, the shield would be so placed that as viewed from the front, the tube 12 would be screened by lead and from the rear the tube would be screened by steel. Each of these measurements is a unique function of the energy of the gamma radiation intercepted and the chance of obtaining identical readings for two different isotopes using first one then the other obsorber is thus very small.

It may be found desirable that the counting rate from one of the tubes 12 or 13 be measured so that the intensity of the radiation field being examined can be determined. This can be achieved in the circuit of FIGURE 3 by replacing the tube connected to transistor 41 by a pulse generator operating at a predetermined count rate. In this way the reading of the meter 49 is dependent upon the ratio of the unknown or variable count rate, due to the intensity of the source being tested, to the known count rate from the pulse generator.

A suitable counter for feeding to selector switch 99 to replace the tube 12 is shown in FIGURE 5. This comprises a Uni junction transistor 100 with grounded base resistor 101 and load resistor 102 connected to wire 20 (FIGURE 4). The junction 103 is connected to one side of timing condenser 104. The other side of condenser 104 is taken to ground A charging resistor 105 for condenser 104 is fed from a movable contactor 106 arranged to select one from a plurality of variable resistors 107 to 109, which resistors in turn are fed from wire 20. Signals developed in the load resistor 102 are coupled to switch 99 through a condenser 110.

This pulse generator is a simple relaxation oscillator circuit in which the capacitor 104 charges up through resistance 105 and the selected variable resistor 107 to 109 chosen by contact 106. When the "stand-off" voltage of the Uni junction transistor is reached, the condenser 104 is rapidly discharged and a positive going pulse is available through condenser 110. Since the current through the chosen resistor 107 to 109 and series resistor 105 is not sufficient to maintain conduction through the junction 103 the transistor switches back to its original high emitter resistance condition after discharge of condenser 104, and the output pulse through 110 ceases.

Selection of the circuit to be connected to transistor base 63 is made by means of switch 99 which can be placed in one of two positions, the first for energy measurement connected to tube 12 and the second to the circuit of FIGURE 5 when field intensity measurements are required. Variable resistors 107, 108 and 109 are preset to achieve a known counting rate for the circuit of FIGURE 5 which will therefore lead to calibrated deflections of meter 49 when the tube connected to transistor 40 is placed in a field to be measured. Additional resistors similar to 107, 108 and 109 may be provided to extend the intensity range as the tubes 12 and 13 are replaced for those of higher and lower intensity, as described before.

The embodiments of the invention in which an exclusive property or privilege is claimed are defined as follows:

1. In apparatus for measuring the energy of local radiation which includes, a pair of radiation detectors of the counting pulse type, whose rate of counting depends upon the number of radiations quanta intercepted in a given time interval, a radiation absorbing shield for absorbing a proportion of the radiation falling on one of said detectors, said proportion being dependent upon the energy of the radiation, and means for deriving the ratio of the number of counts of said shielded detector and the sum of the number of counts of both said detectors as a potential difference, said ratio being a function of the local radiation energy, the improvement comprising said radiation absorbing shield being formed of at least two dissimilar materials of different absorption coefficients for a given energy of radiation, for providing different attenuations for radiation encountering said one detector from separate chosen directions, the rate of counting of said one detector being determined by that material which is interposed between said one detector and a source of radiation.

2. An apparatus as defined in claim 1 including means for measuring the rate of counting of one of said detectors.

3. An apparatus as defined in claim 2 including a counter circuit for generating pulses at a predetermined count rate and means for comparing the count rate of said pulses with the count rate of one of said detectors, whereby to determine the intensity of said local radiation.

4. In a probe for use in measuring the energy of local radiation, the combination of a pair of radiation detectors of the counting pulse type enclosed within a common housing, and a radiation absorbing shield arranged to absorb a proportion of the radiation falling on one of said detectors, said radiation absorbing shield being formed of at least two dissimilar materials of different absorption coefficients for a given energy of radiation, for providing different attenuations for radiation encountering said one detector from separate chosen directions, the rate of counting of said one detector being determined by that material which is interposed between said one detector and a source of radiation.

5. A probe according to claim 4 wherein said shield comprises a cylinder surrounding said one detector, one half of said cylinder facing in one direction of detection being formed of a first absorbing material, and the other half being formed of another material having a different radiation attenuation than said first absorbing material.

References Cited by the Examiner
UNITED STATES PATENTS 2,563,333  8/1951  Herzog _____ 250—83.6
2,744,697  5/1956  Van Allen _____ 250—83.6 X

OTHER REFERENCES

Dual Detectors Key to Radioisotope Identifier, by R. W. Tolmie, from Nucleonics, October, 1960, page 92.

RALPH G. NILSON, *Primary Examiner.*

ARCHIE R. BORCHELT, *Examiner.*